(12) United States Patent
Kim et al.

(10) Patent No.: US 7,515,228 B2
(45) Date of Patent: Apr. 7, 2009

(54) DISPLAY PANEL ASSEMBLY AND DISPLAY APPARATUS HAVING THE SAME

(75) Inventors: Jae-Hyun Kim, Suwon-si (KR); Dae-Ho Choo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 11/454,458

(22) Filed: Jun. 16, 2006

(65) Prior Publication Data

US 2006/0290850 A1 Dec. 28, 2006

(30) Foreign Application Priority Data

Jun. 22, 2005 (KR) ...................... 10-2005-0053876

(51) Int. Cl.
*G02F 1/1335* (2006.01)
*G02F 1/03* (2006.01)

(52) U.S. Cl. ........................ 349/114; 349/113; 359/247

(58) Field of Classification Search ....................... None
See application file for complete search history.

(56) References Cited

U.S. PATENT DOCUMENTS

| | | | |
|---|---|---|---|
| 4,545,648 A * | 10/1985 | Shulman et al. ............. 349/114 |
| 5,982,464 A * | 11/1999 | Wang et al. .................. 349/108 |
| 7,088,405 B2 * | 8/2006 | Kotchick et al. ............ 349/114 |
| 7,236,286 B2 * | 6/2007 | Clikeman et al. ........... 359/247 |
| 7,271,865 B2 * | 9/2007 | Zhu et al. .................... 349/113 |
| 2002/0054256 A1 * | 5/2002 | Kim et al. .................... 349/113 |
| 2002/0097358 A1 * | 7/2002 | Ueki et al. ................... 349/113 |
| 2004/0160537 A1 * | 8/2004 | Okamoto et al. .............. 349/12 |
| 2004/0212765 A1 * | 10/2004 | Kano et al. .................. 349/114 |
| 2005/0122453 A1 * | 6/2005 | Jang et al. ................... 349/114 |
| 2005/0140846 A1 * | 6/2005 | Lubart et al. .................. 349/62 |
| 2006/0109404 A1 * | 5/2006 | Maeda ........................ 349/119 |

FOREIGN PATENT DOCUMENTS

JP 2005-30991 2/2005

* cited by examiner

*Primary Examiner*—Michelle R Connelly Cushwa
(74) *Attorney, Agent, or Firm*—F. Chau & Assoc., LLC

(57) ABSTRACT

A display panel assembly capable of improving image display quality and a display apparatus having the display panel, wherein the display panel assembly includes a display panel and a transflective member. The display panel includes two substrates and a liquid crystal layer interposed between the two substrates. The transflective member is disposed under the display panel to transmit a backlight toward a front of the display panel and to reflect a front light having passed through the display panel back toward the front of the display panel. Therefore, the front light is partially reflected by the transflective member to increase a luminance of the display apparatus, thereby improving the image display quality.

20 Claims, 12 Drawing Sheets

DISPLAY PANEL ASSEMBLY AND DISPLAY APPARATUS HAVING THE SAME

CROSS-REFERENCE TO RELATED APPLICATIONS

This application relies for priority upon Korean Patent Application No. 2005-53876 filed on Jun. 22, 2005, the contents of which are herein incorporated by reference in its entirety.

BACKGROUND OF THE INVENTION

1. Technical Field

The present disclosure relates to a display panel assembly and a display apparatus having the display panel. More particularly, the present disclosure relates to a display panel assembly capable of improving an image display quality and a display apparatus having the display panel.

2. Discussion of the Related Art

A liquid crystal display (LCD) device is generally classified into a transmissive LCD apparatus displaying an image using an internally provided light that is generated from a backlight assembly, and a reflective LCD apparatus displaying the image using an externally provided light such as sunlight.

The transmissive LCD apparatus displays an image in a dark place using the internally provided light generated from the backlight assembly. However, the transmissive LCD apparatus has disadvantages, such as high power consumption, caused by generation of the internally provided light and low image display quality caused by reflection of externally provided light.

The reflective LCD apparatus is not capable of displaying an image in a dark place. However, the reflective LCD apparatus has certain advantageous characteristics, such as lower power consumption and better image display quality in a bright place, than the transmissive LCD apparatus. The low power consumption of the reflective LCD apparatus is a result of not requiring the internal backlight assembly.

Thus, a transflective LCD apparatus capable of displaying an image of high display quality in both a dark place and a bright place has been devised.

The transflective LCD apparatus includes an LCD panel displaying the image using the internally provided light and the externally provided light, and a backlight assembly providing the LCD panel with the internally provided light. The LCD panel includes a plurality of unit pixels, and each of the unit pixels includes a transmissive area displaying the image using the internally provided light and a reflective area displaying the image using the externally provided light.

Therefore, the transflective LCD apparatus displays the image using a transmissive mode in a dark place and a reflective mode in a bright place. In the transmissive mode, the internally provided light passes through the transmissive area to display the image. In the reflective mode, the externally provided light is reflected from the reflective area to display the image.

However, in the reflective mode of the transflective LCD apparatus, a portion of the externally provided light is reflected from the reflective area, and a remaining portion of the externally provided light passes through the transmissive area, thereby losing that remaining portion of the externally provided light. That is, the remaining portion of the externally provided light is lost so as to decrease a luminance of the transflective LCD apparatus in the reflective mode, thereby deteriorating the image display quality of the transflective LCD apparatus.

SUMMARY OF THE INVENTION

An embodiment of the present invention provides a display panel assembly capable of increasing a reflectivity to improve image display quality.

An embodiment of the present invention also provides a display apparatus having the above-mentioned display panel assembly.

A display panel assembly in accordance with an embodiment of the present invention includes a display panel and a transflective member. The display panel includes two substrates and a liquid crystal layer interposed between the two substrates. The transflective member is disposed under the display panel to transmit a backlight toward the display panel and to reflect a front light having passed through a front of the display panel back toward the display panel.

The transflective member may further include a base sheet under the display panel, and a total reflective material in grooves formed in the base sheet to totally reflect the front light.

A display apparatus in accordance with an embodiment of the present invention includes a backlight assembly and a display panel assembly. The backlight assembly generates a backlight. The display panel assembly includes a display panel displaying an image using a front light and the backlight, and a transflective member transmitting the backlight toward a front of the display panel, and reflecting the front light having passed through the display panel back toward the front of the display panel.

According to the display panel assembly and a display apparatus having the display panel assembly, the front light that is externally provided from the display panel assembly is reflected from the transflective member to increase the luminance, thereby improving the image display quality.

BRIEF DESCRIPTION OF THE DRAWINGS

Exemplary embodiments of the present invention can be understood in more detail from the following descriptions taken in conjunction with the accompanying drawings wherein.

DESCRIPTION OF THE EXEMPLARY EMBODIMENTS

Figure 1:
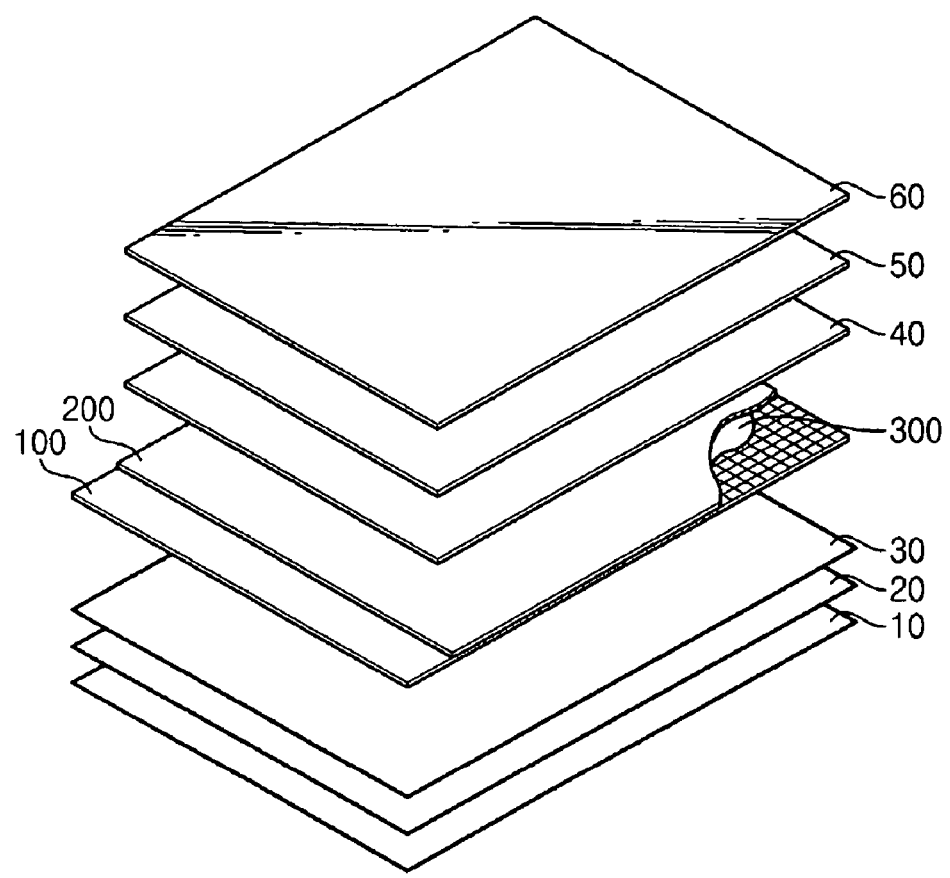
FIG. 1 is a perspective view illustrating a display panel assembly according to an embodiment of the present invention.

Exemplary embodiments of the present invention are described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
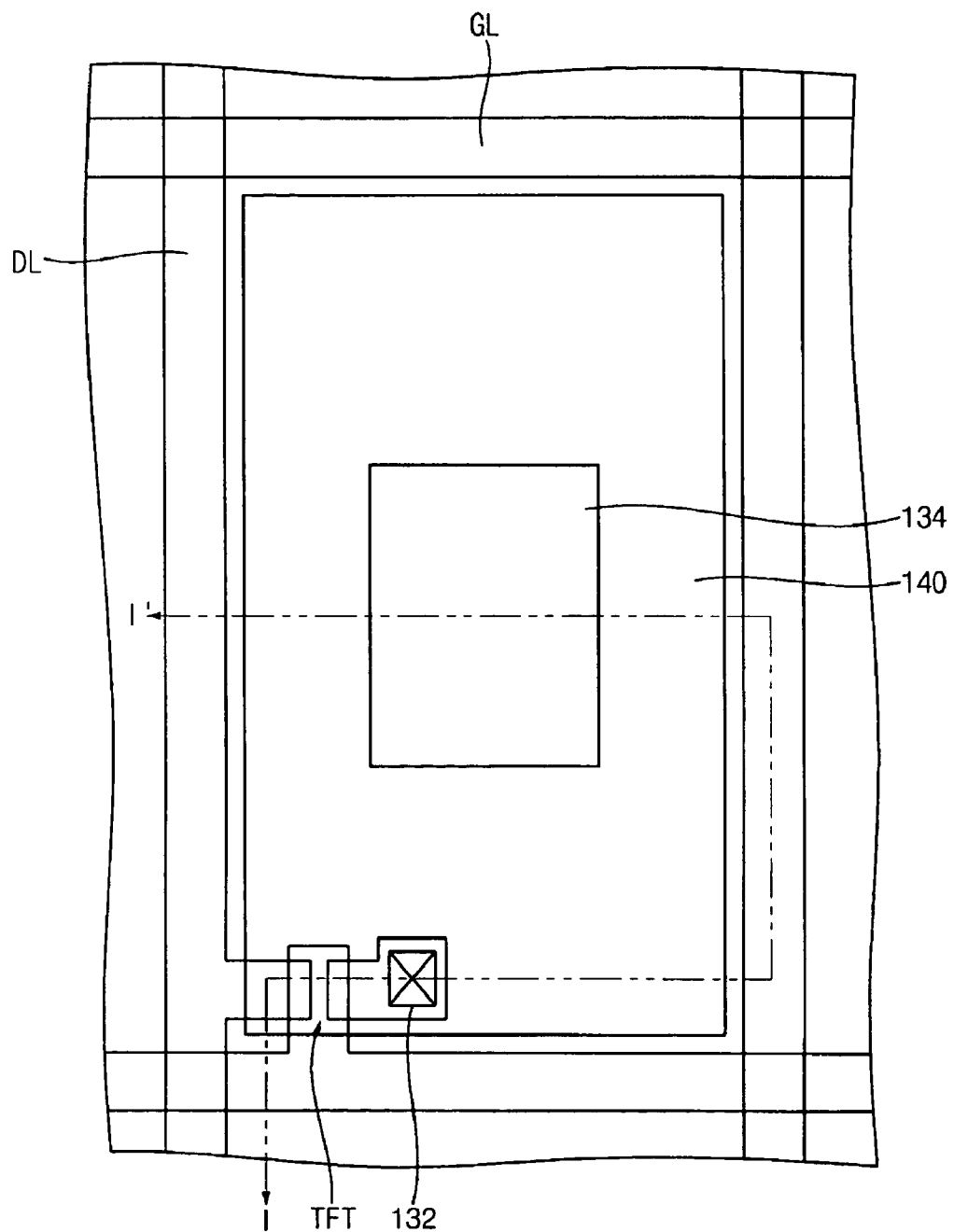
FIG. 2 is a plan view illustrating a unit pixel in the display panel in FIG. 1.
Figure 3:
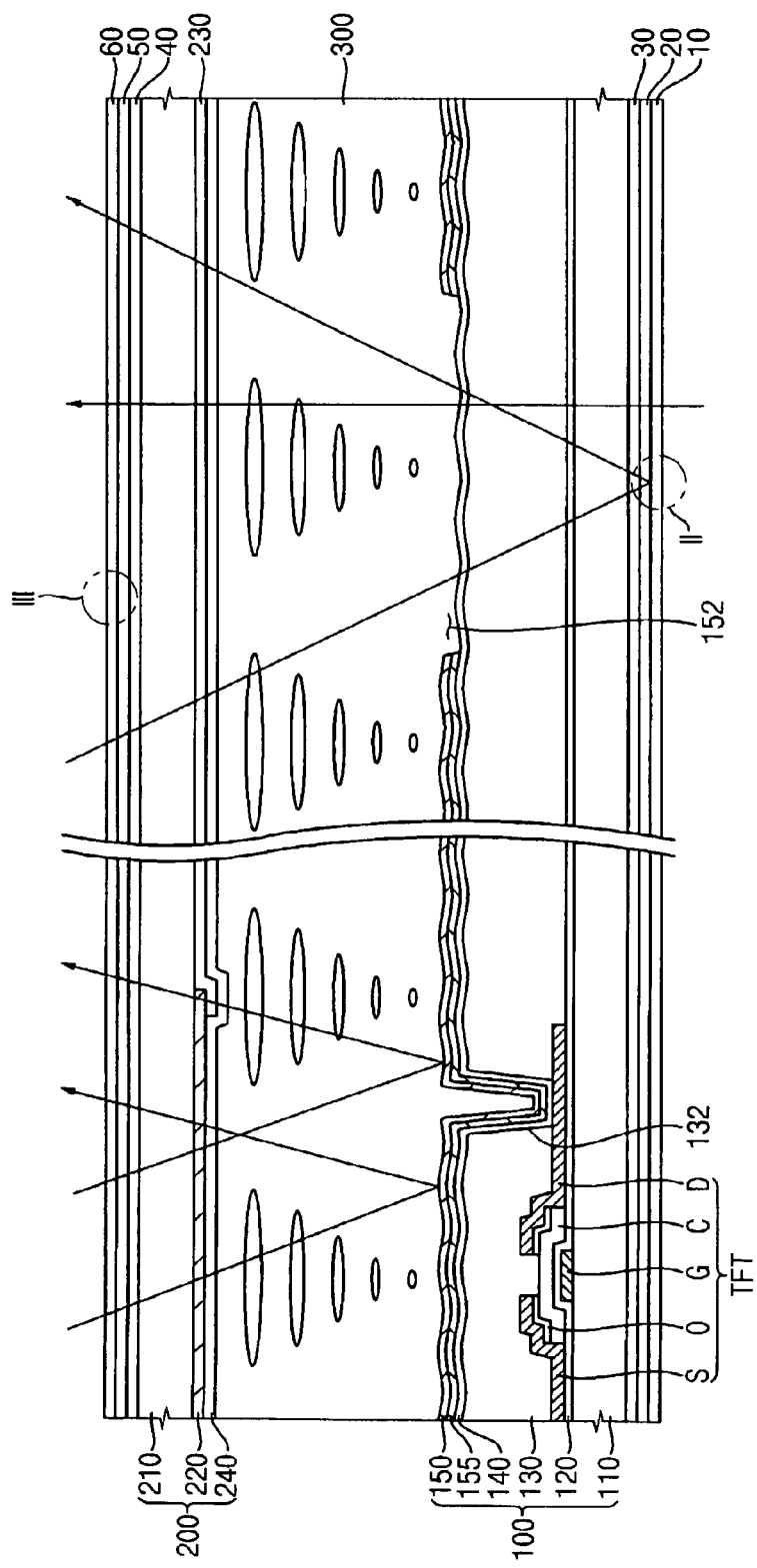
FIG. 3 is a cross-sectional view taken along line I-I' in FIG. 2.

FIG. 1 is a perspective view illustrating a display panel assembly according to an embodiment of the present invention. FIG. 2 is a plan view illustrating a unit pixel in the display panel in FIG. 1. FIG. 3 is a cross-sectional view taken along line I-I' in FIG. 2.

Referring to FIGS. 1 to 3, the display panel assembly includes a first substrate 100, a second substrate 200, a liquid crystal layer 300, a transflective layer 10, a first polarizer 20, a first phase difference film 30, a second phase difference film 40, a second polarizer 50 and a light refracting sheet 60, and displays an image using a front light that is provided from an exterior to the display panel assembly and a backlight that is generated from a backlight assembly (not shown).

The transflective layer 10, the first polarizer 20 and the first phase difference film 30 are on a lower surface of the first substrate 100, in sequence. In particular, the first phase difference film 30 is on the lower surface of the first substrate 100. The first polarizer 20 is on a lower surface of the first phase difference film 30. The transflective layer 10 is on a lower surface of the first polarizer 20. The second phase difference film 40, the second polarizer 50 and the light refracting sheet 60 are on an upper surface of the second substrate 200, in sequence. In particular, the second phase difference film 40 is on the upper surface of the second substrate 200. The second polarizer 50 is on an upper surface of the second phase difference film 40. The light refracting sheet 60 is on an upper surface of the second polarizer 50.

The first substrate 100 includes a first transparent substrate 110, a data line DL, a gate line GL, a storage electrode (not shown), a gate insulating layer 120, a thin film transistor TFT, a protecting layer 130, a pixel electrode 140, a reflective layer 150, a connecting layer 155 and a first alignment layer (not shown). Alternatively, the first substrate may further include a plurality of data lines, a plurality of gate lines, a plurality of storage electrodes, a plurality of thin film transistors and a plurality of pixel electrodes.

The first transparent substrate 110 has a substantially planar shape, and is formed of a transparent material. Examples of the transparent material that may be used for the first transparent substrate 110 include glass, quartz, etc. The gate lines GL are on the first transparent substrate 110, and arranged in a first direction. The gate lines GL are in substantially parallel with each other.

The storage electrode may be formed from substantially the same layer as the gate lines GL. The storage electrode is arranged in the first direction that is substantially the same direction as the gate lines GL. A storage capacitor having the storage electrode stores an electric charge to maintain a voltage difference between the pixel electrodes 140 and a common electrode (not shown).

The gate insulating layer 120 is on the first transparent substrate 110 and covers the gate lines GL and the storage electrode.

The thin film transistor (TFT) includes a gate electrode G, a source electrode S, a drain electrode D, a channel layer C and an ohmic contact layer O.

The gate electrode G is extended from each of the gate lines GL in a second direction that is substantially perpendicular to the first direction and are spaced at a predetermined distance. The gate insulating layer 120 is on the gate electrode G. The channel layer C is on the gate insulating layer 120 corresponding to the gate electrode G. The source electrode S and the drain electrode D are on the channel layer C, and are spaced apart from each other. The ohmic contact layer O includes a portion between the source electrode S and the channel layer C, and another portion between the drain electrode D and channel layer C. The ohmic contact layer O decreases contact resistance between the source electrode S and the channel layer C and between the drain electrode D and the channel layer C. The portions of the ohmic contact layer O are spaced apart from each other, and are electrically separated.

The data lines DL are on the gate insulating layer 120 in the second direction, and are arranged substantially in parallel with each other. The source electrode S is extended from each of the data lines DL in the first direction at a predetermined distance.

The protecting layer 130 is on the gate insulating layer 120 and covers the TFT and the data lines DL. For example, the protecting layer 130 may include an organic insulating layer, and has a greater thickness than the gate insulating layer 120. The protecting layer 130 may have an uneven surface. The protecting layer 130 includes a contact hole 132 through which the drain electrode D is partially exposed so that the drain electrode D is electrically connected to the pixel electrode 140.

The pixel electrode 140 is on the protecting layer 130 in a pixel area defined by the data and gate lines DL and SL. The pixel electrode 140 is electrically connected to the drain electrode D through the contact hole 132, and receives a pixel voltage through the drain electrode D. The pixel electrode 140 is on the protecting layer 130 having the uneven surface, and has an uneven lower surface corresponding to the uneven surface of the protecting layer 130.

The pixel electrode 140 is formed by a photolithography process. The pixel electrode 140 includes a transparent conductive material. Examples of the transparent conductive material that may be used for the pixel electrode 140 include indium tin oxide film (ITO), tin oxide (TO), indium zinc oxide film (IZO), zinc oxide (ZO), amorphous indium tin oxide film (a-ITO), indium tin zinc oxide (ITZO), etc.

The reflective layer 150 is on the pixel electrode 140 except for a transmitting window 152 through which the light passes. The reflective layer 150 includes a highly reflective material for reflecting a portion of the front light. Examples of the highly reflective material that may be used for the reflective layer 150 includes aluminum (Al), aluminum neodymium alloy (AlNd), etc.

The reflective layer 150 includes a reflective part from which a portion of the front light is reflected and the transmitting window 152 through which a portion of the backlight passes. The reflective part is in a first area corresponding to the reflective layer 150. The transmitting window 152 is in a second area free from the reflective layer 150. That is, the transmitting window 152 is in the second area that does not correspond to the reflective layer 150. For example, the transmitting window 152 has the area of about 60% to about 70% with respect to a total area of each of the unit pixels.

The reflective layer 150 is on the pixel electrode 140 along the uneven surface of the pixel electrode 140 so as to also have an uneven upper surface. The portion of the front light is reflected from the uneven upper surface of the reflective layer 150 in various directions because of this uneven surface.

The connecting layer 155 is between the reflective layer 150 and the pixel electrode 140. When the reflective layer 150 makes direct contact with the pixel electrode 140, surface characteristics of the pixel electrode 140 may be changed. However, in FIGS. 1 to 3, the connecting layer 155 prevents direct contact between the reflective layer 150 and the pixel electrode 140 in order to protect the pixel electrode 140. The connecting layer 155 may include a molybdenum tungsten alloy (MoW) for example.

The first alignment layer (not shown) is formed on the pixel electrode to cover the reflective layer 150. The first alignment layer includes a plurality of first aligning recesses to align liquid crystal molecules of the liquid crystal layer 300 along a predetermined direction.

The second substrate 200 includes a second transparent substrate 210, a light blocking layer 220, a color filter 230, a common electrode 240 and a second alignment layer (not shown). The second substrate 200 corresponds to the first substrate 100.

The second substrate 210 includes a transparent material. Examples of the transparent material that may be used for the second substrate 210 include glass, quartz, etc. The second substrate 210 may include substantially the same material as the first transparent substrate 110. The second substrate 210 may have a smaller size than the first transparent substrate 110.

The light blocking layer 220 is on the second transparent substrate 210, and corresponds to the TFT, the data lines DL and the gate lines GL. The light blocking layer 220 blocks a portion of the light passing through the second substrate 200 so that the TFT, data lines DL and gate lines GL are not displayed.

The color filter 230 is on the second transparent substrate 210 corresponding to the pixel electrode 140. The color filter 230 may cover a portion of the light blocking layer 220.

For example, the color filter 230 includes a red color filter portion, a green color filter portion and a blue color filter portion. The red color filter portion transmits a red light from a white light. The green color filter portion transmits a green light from the white light. The blue color filter portion transmits a blue light from the white light.

The common electrode 240 is on substantially the entire surface of the light blocking layer 220 and the color filter 230.

The common electrode 240 receives a common voltage from an external power generating device. The common electrode 240 includes a transparent conductive material. Examples of the transparent conductive material that may be used for the common electrode 240 include indium tin oxide (ITO), tin oxide (TO), indium zinc oxide (IZO), zinc oxide (ZO), amorphous indium tin oxide (a-ITO), indium tin zinc oxide (ITZO), etc. The common electrode 240 may include substantially the same material as the pixel electrode 140.

A second alignment layer (not shown) is on the common electrode 240. A plurality of second aligning grooves (not shown) is formed on the second alignment layer (not shown) to align the liquid crystal molecules of the liquid crystal layer 300 in the predetermined direction.

The liquid crystal layer 300 is interposed between the first substrate 100 and the second substrate 200. When the pixel voltage and the common voltage are applied to the pixel electrode 160 and the common electrode 240, respectively, an electric field is formed between the common electrode 240 and the pixel electrode 160. The liquid crystal molecules of the liquid crystal layer 300 vary in arrangement in response to the electric field applied thereto, and thus a light transmittance of the liquid crystal layer 300 is changed. The front light or the backlight having the changed light transmittance passes through the color filter 230 to display an image.

The transflective layer 10 is disposed under the first substrate 100 so that a portion of the front light having passed through the transmitting window 152 is reflected from the transflective layer 10. Also, the transflective layer 10 transmits the backlight generated from the backlight assembly (not shown) that is disposed under the transflective layer 10. For example, about 70% of the front light having passed through the transmitting window 152 is reflected from the transflective layer 10, and about 70% of the backlight passes through the transflective layer 10. The display panel assembly includes the transflective layer 10 so that the display panel assembly displays the image using the increased amount of the front light and the increased amount of the backlight, thereby increasing the luminance of the display panel assembly.

The first polarizer 20 is interposed between the first substrate 100 and the transflective layer 10. The second polarizer 50 is on the second substrate 200. Each of the first and second polarizers 20 and 50 polarizes the light in a polarizing direction. For example, the polarizing axis of the first polarizer 20 is substantially perpendicular to the polarizing axis of the second polarizer 50.

The first phase difference film 30 is interposed between the first substrate 100 and the first polarizer 20, and the second phase difference film 40 is on the second polarizer 50. The first phase difference film 30 has a first longitudinal axis. The second phase difference film 40 has a second longitudinal axis that is substantially perpendicular to the first longitudinal axis. Each of the first and second phase difference films 30 and 40 changes a phase of the light by about ¼ λ. Alternatively, each of the first and second phase difference films 30 and 40 may change the phase of the light by about ½ λ.

The light refracting sheet 60 is on the second polarizer 50, and refracts the light passing through the liquid crystal layer 300 to increase a luminance when viewed on a plane. In FIGS. 1 to 3, the light refracting sheet 60 is on the second polarizer 50. Alternatively, the light refracting sheet 60 may be interposed between the second polarizer 50 and the second phase difference film 40.

Figure 4:
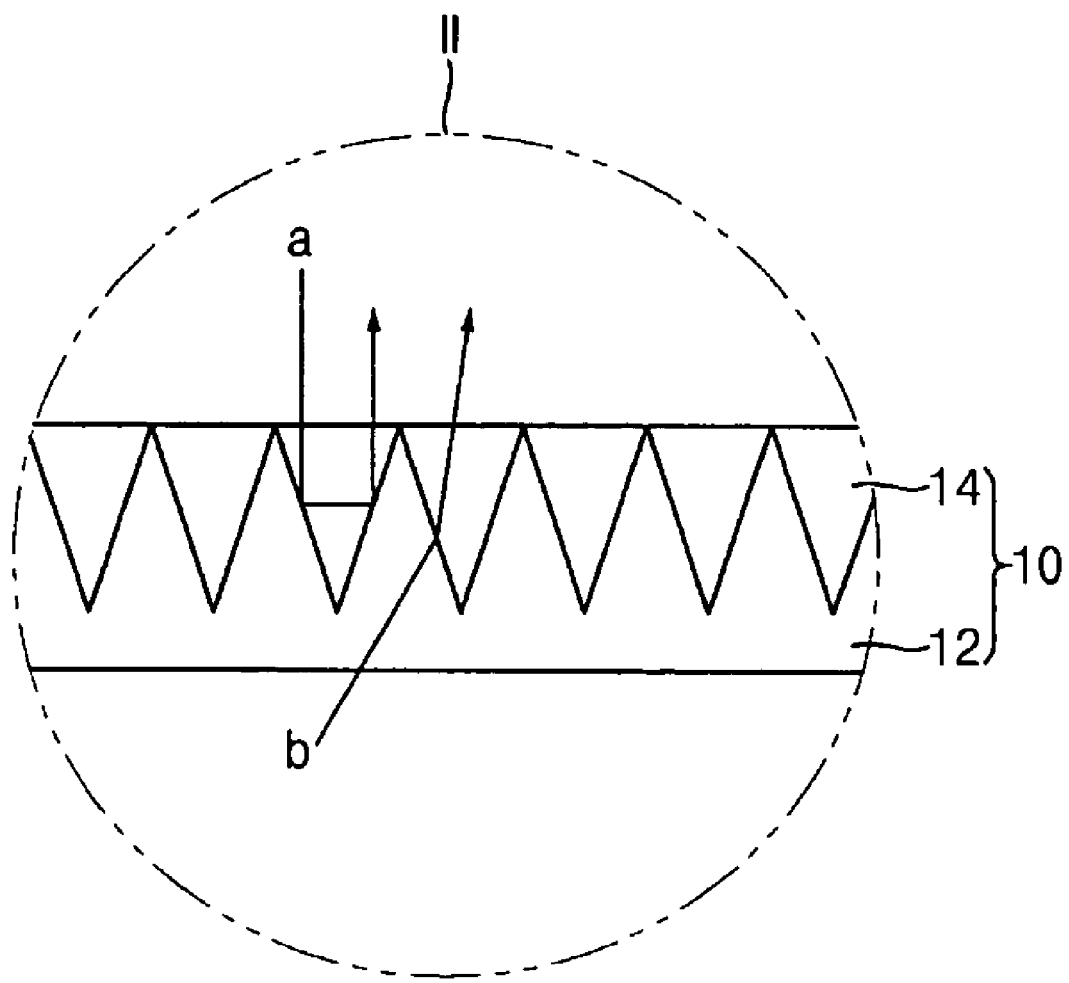
FIG. 4 is an enlarged cross-sectional view illustrating a portion 'II' in FIG. 3.

FIG. 4 is an enlarged cross-sectional view illustrating a portion 'II' in FIG. 3.

Referring to FIGS. 1 to 4, the transflective layer 10 includes a base sheet 12 and a total reflective material 14.

The first base sheet 12 is disposed under the first polarizer 20, and includes a transparent synthetic resin that transmits light. For example, the first base sheet 12 includes polymethyl methacrylate (PMMA), and diffuses the light to increase luminance uniformity. The first base sheet 12 has a first refractive index.

The total reflective material 14 is in a plurality of recesses formed in the base sheet 12 to totally reflect a portion of the front light having passed through the transmitting window 152. Alternatively, the total reflective material 14 may be in a plurality of grooves formed in the base sheet 12. The base sheet 12 having the total reflective material 14 may be pressed to form the recesses.

The total reflective material 14 includes a synthetic resin different from the base sheet 12, and that has a second refractive index. The second refractive index is larger than the first refractive index so that the front light is totally reflected from the total reflective material 14.

The total reflective material 14 in each of the recesses has a substantially triangular cross-section. In FIG. 4, the total reflective material 14 in each of the recesses may have a substantially equilateral triangular cross-section. A lower side of the equilateral triangular cross-section may be substantially parallel with an upper surface of the first substrate 100. A height of the equilateral triangular cross-section is smaller than a thickness of the base sheet 12. In FIG. 4, the total reflective material 14 in each of the recesses has the substantially equilateral triangular cross-section so that the total reflective material totally reflects the front light that is incident into the first substrate 100 in a direction substantially perpendicular to the upper surface of the first substrate 100.

A reflective material (not shown) may be formed on the total reflective material 14 to increase the reflectivity of the total reflective material 14. That is, the reflective material is interposed between the base sheet 12 and the total reflective material 14 to increase the reflectivity of the front light. For example, the reflective material may include a metal, and examples of the metal that may be used for the reflective material include aluminum, neodymium, etc. Alternatively, the reflective material may include aluminum alloy. The thickness of the reflective material may be no more than about 500 Å. For example, the thickness of the reflective material may be about 100 Å to about 200 Å.

The portion of the front light having passed through the transmitting window 152 is totally reflected from the total reflective material 14 toward an upper portion of the first substrate 100, and the backlight generated from the backlight assembly (not shown) is refracted by the total reflective material 14 toward the upper portion of the first substrate 100.

Figure 5A:
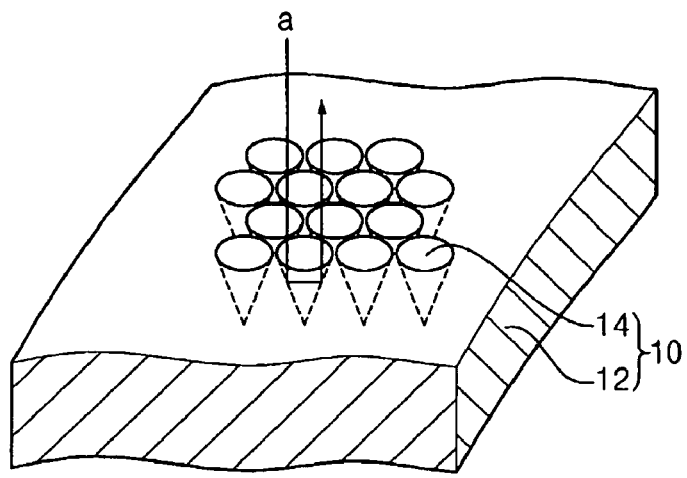
FIGS. 5A and 5B are perspective views illustrating a transflective layer of the display panel in FIG. 1.
Figure 5B:
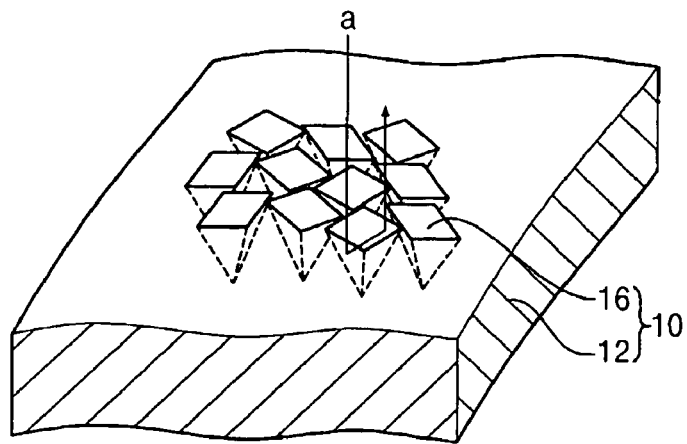

FIGS. 5A and 5B are perspective views illustrating a transflective layer of the display panel in FIG. 1. FIG. 5A is a perspective view illustrating a transflective layer having a conically shaped total reflective material. FIG. 5B is a perspective view illustrating a transflective layer having a substantially quadrangular pyramid-shaped total reflective material.

Referring to FIG. 5A, the total reflective material 14 is disposed in a plurality of recesses formed in the base sheet 10 having a substantially conical shape. That is, each of the recesses has the substantially conical shape. A bottom surface of the conical shape may be substantially parallel with an upper surface of the first substrate 100.

Referring to FIG. 5B, the total reflective material 16 is disposed in a plurality of recesses formed in the base sheet 10 having a substantially polygonal pyramid shape. For example, the total reflective material 16 disposed in each of the recesses that is formed in the base sheet 10 and that has a substantially quadrangular-pyramid shape. A bottom surface of the polygonal pyramid shape may be substantially parallel with an upper surface of the first substrate 100.

Figure 6:
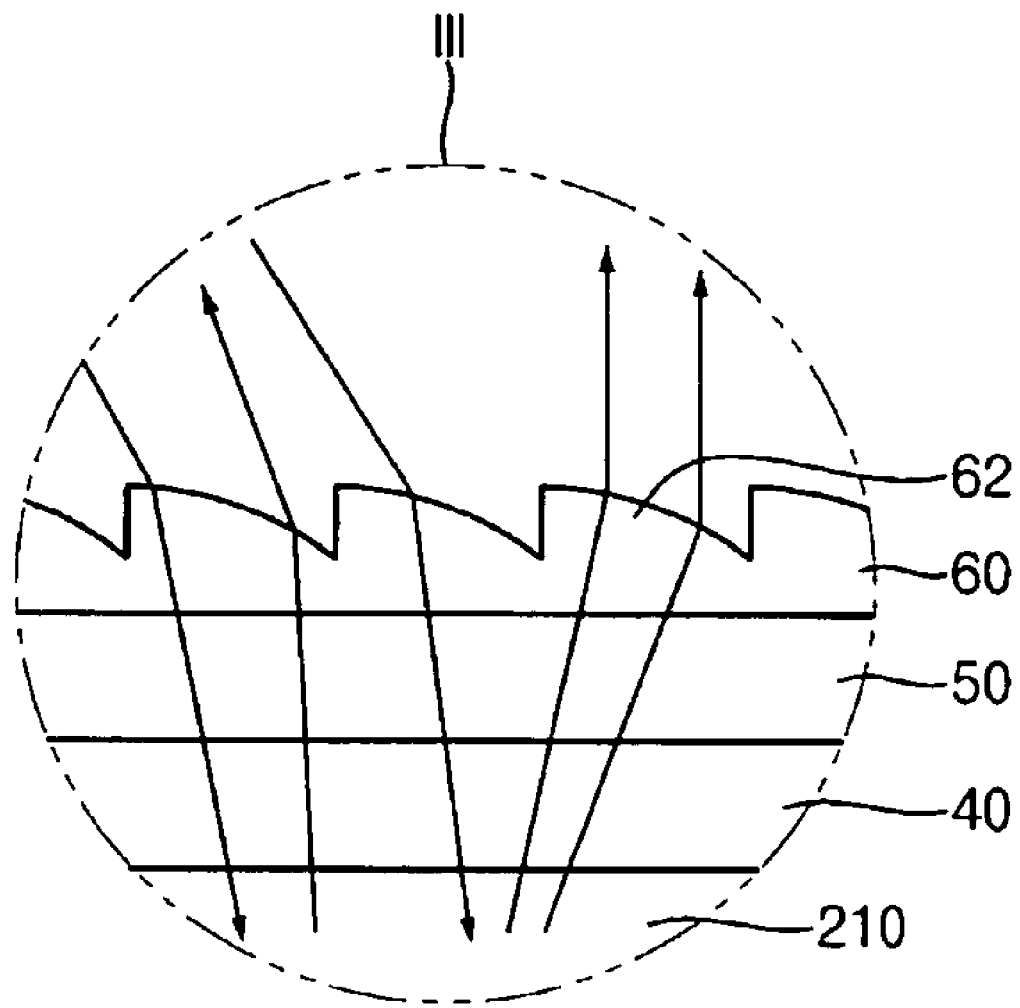
FIG. 6 is an enlarged cross-sectional view illustrating a portion 'III' in FIG. 3.

FIG. 6 is an enlarged cross-sectional view illustrating a portion 'III' in FIG. 3.

Referring to FIG. 6, the light refracting sheet 60 is on the second polarizer 50, and includes a plurality of prisms 62 to refract light exiting from the light refracting sheet 60 toward an exterior to the display panel assembly. Each of the prisms 62 of the light refracting sheet 60 may have a sawtooth-shaped cross-section. For example, a side of the sawtooth shape can have a rounded shape. In FIG. 6, each of the prisms 62 of the light refracting sheet 60 has the sawtooth-shaped cross-section. Alternatively, each of the prisms 62 of the light refracting sheet 60 may have a substantially triangular cross-section to increase a luminance when viewed on axis.

Hereinafter, a path of light in the display panel assembly is described.

Figure 7:
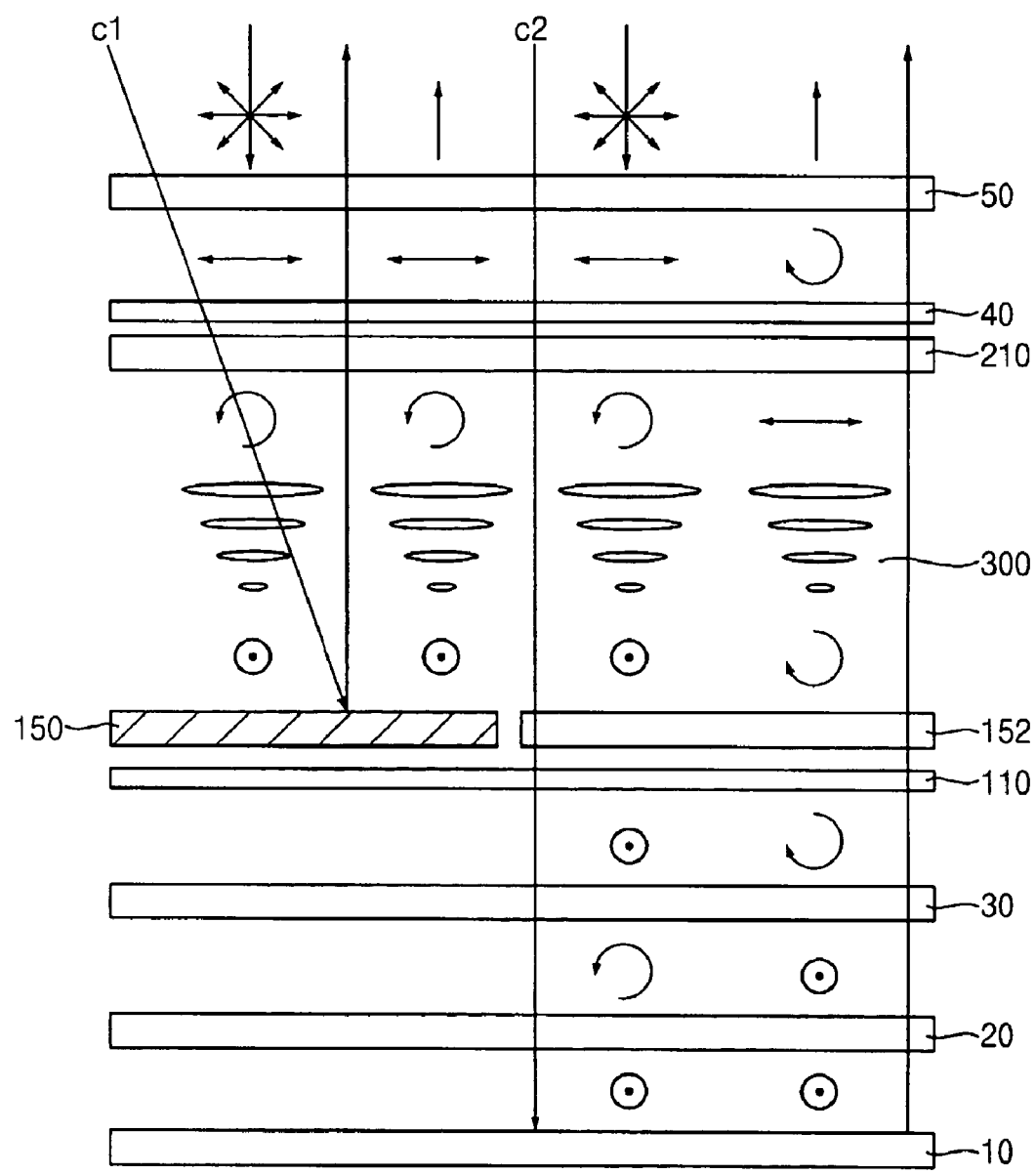
FIG. 7 is a cross-sectional view illustrating a path of light, when an electric field is not applied to a liquid crystal layer of the display panel assembly in FIG. 1.

FIG. 7 is a cross-sectional view illustrating a path of light, when an electric field is not applied to a liquid crystal layer of the display panel assembly in FIG. 1.

Referring to FIG. 7, a portion c1 of the front light that is provided from an exterior to the display panel assembly passes through the second polarizer 50 and is linearly polarized in a third direction. The linearly polarized light that is linearly polarized in the third direction passes through the second phase difference film 40 so that a phase of the linearly polarized light is changed by about $\lambda/4$. Therefore, the linearly polarized light in the third direction becomes a circularly polarized light in a counterclockwise direction. Here, $\lambda$ is a wavelength of the light.

The circularly polarized light passes through the liquid crystal layer 300, to which the electric field is not applied, so that the phase of the circularly polarized light is changed by about $\lambda/4$. Therefore, the circularly polarized light becomes linearly polarized light that is polarized in a fourth direction that is substantially perpendicular to the third direction. The linearly polarized light in the fourth direction is reflected from the reflective layer 150.

The reflected light passes back through the liquid crystal layer 300 so that a phase of the reflected light is changed by about $\lambda/4$. Therefore, the reflected light becomes a circularly polarized light in a counterclockwise direction. The circularly polarized light passes through the second phase difference film 40 so that a phase of the circularly polarized light is changed by about $\lambda/4$ to be linearly polarized in the third direction. The linearly polarized light in the third direction passes through the second polarizer 50 to display the image.

A portion c2 of the front light that is provided from the exterior to the display panel assembly passes through the second polarizer 50 and is linearly polarized in the third direction. The linearly polarized light that is linearly polarized in the third direction passes through the second phase difference film 40 so that a phase of the linearly polarized light is changed by about a $\lambda/4$ phase. Therefore, the linearly polarized light in the third direction becomes a circularly polarized light in a counterclockwise direction.

The circular polarized light passes through the liquid crystal layer 300, to which the electric field is not applied, so that the phase of the circularly polarized light is changed by about $\lambda/4$. Therefore, the circularly polarized light becomes a linearly polarized light that is polarized in the fourth direction that is substantially perpendicular to the third direction.

The linearly polarized light in the fourth direction passes through the first phase difference film 30 that is disposed under the first transparent substrate 110 so that a phase of the linearly polarized light in the fourth direction is changed by about $\lambda/4$. Therefore, the linearly polarized light in the third direction becomes a circularly polarized light in the counter-clockwise direction. The circularly polarized light passes through the first polarizer 20 to be a linearly polarized light in the fourth direction.

The linearly polarized light in the fourth direction is reflected from the transflective layer 10 toward the front of the display panel. The reflected light passes through the first polarizer 20. The light having passed through the first polarizer 20 passes through the first phase difference film 30 so that a phase of the light incident into the first phase difference film 30 is changed by about $\lambda/4$. Therefore, the linearly polarized light incident into the first phase difference film 30 becomes a circularly polarized light that is circularly polarized in the clockwise direction.

The circularly polarized light passes through the liquid crystal layer 300 so that a phase of the circularly polarized light is changed by about $\lambda/4$. Therefore, the circularly polarized light becomes linearly polarized light that is polarized in the third direction. The linearly polarized light in the third direction passes through the second phase difference film 40 so that a phase of the linearly polarized light in the third direction is changed by about $\lambda/4$. Therefore, the linearly polarized light in the third direction becomes a circularly polarized light that is polarized in the clockwise direction. The circularly polarized light is incident into the second polarizer 50 to be a linearly polarized light that is polarized in the third direction, and the linearly polarized light in the third direction passes through the second polarizer 50.

A portion of a backlight generated from the backlight assembly (not shown) passes through the transflective layer 10. The portion of the backlight having passed through the transflective layer 10 passes through the first polarizer 20. The light having passed through the first polarizer 20 passes through the first phase difference film 30 so that a phase of the passed light is changed by about $\lambda/4$. Therefore, the light having passed through the first phase difference film 30 becomes a circularly polarized light that is polarized in the clockwise direction.

The circularly polarized light passes through the liquid crystal layer 300 so that a phase of the circularly polarized light is changed by about $\lambda/4$. Therefore, the circularly polarized light is linearly polarized in the third direction. The linearly polarized light in the third direction passes through the second phase difference film 40 so that a phase of the linearly polarized light in the third direction is changed by about $\lambda/4$. Therefore, the linearly light polarized in the third direction becomes a circularly polarized light that is circularly polarized in the clockwise direction. The circularly polarized light passes through the second polarizer 50 toward the front of the display panel assembly to be a linearly polarized light in the third direction.

Figure 8:
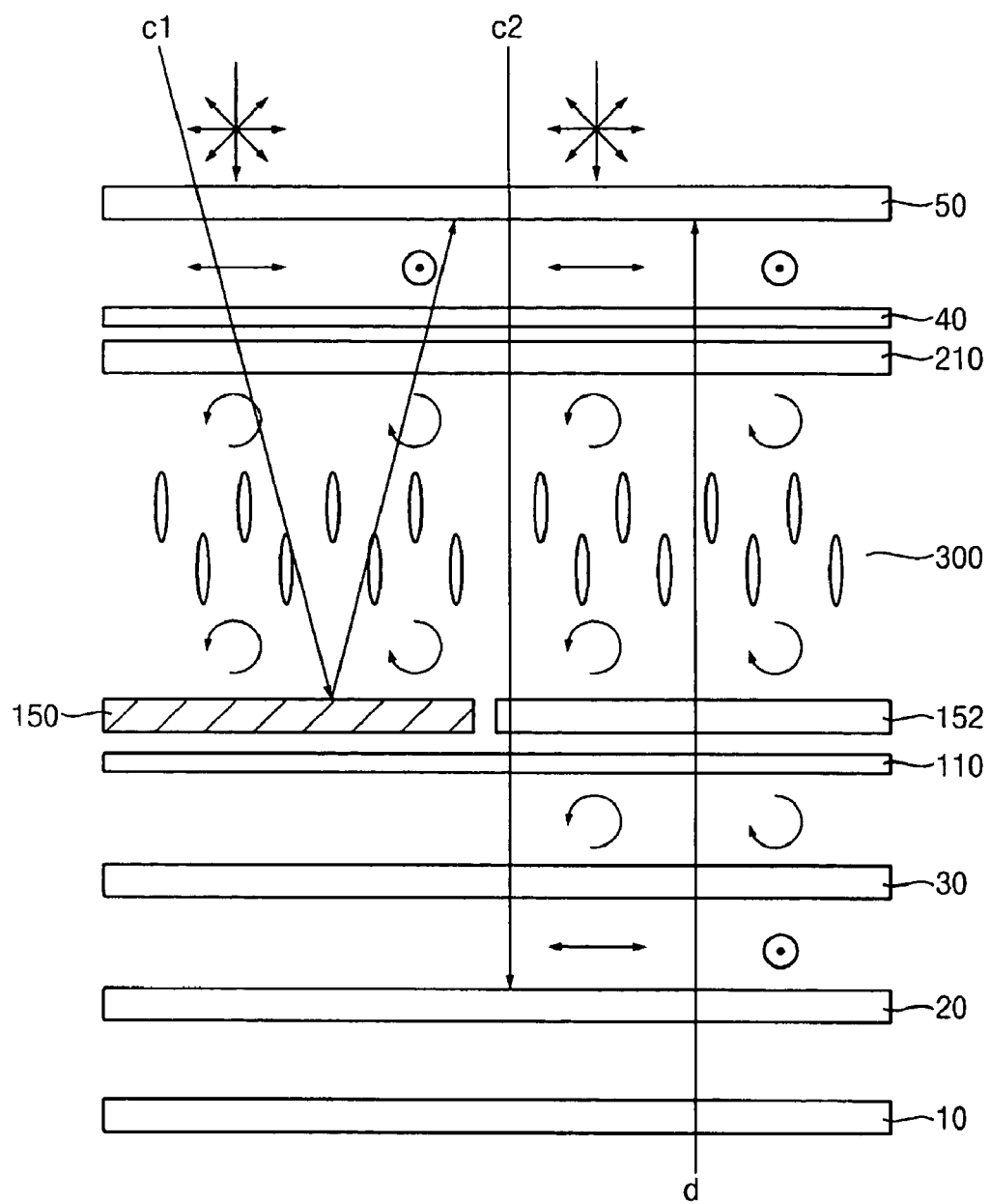
FIG. 8 is a cross-sectional view illustrating a path of light, when an electric field is applied to a liquid crystal layer of the display panel assembly in FIG. 1.

FIG. 8 is a cross-sectional view illustrating a path of light, when an electric field is applied to a liquid crystal layer of the display apparatus in FIG. 1.

Referring to FIG. 8, a portion c1 of the front light that is provided from an exterior to the display panel assembly passes through the second polarizer 50 and is linearly polarized in a third direction. The linearly polarized light that is linearly polarized in the third direction passes through the second phase difference film 40 so that a phase of the linearly polarized light in the third direction is changed by about $\lambda/4$. Therefore, the linearly polarized light in the third direction becomes a circularly polarized light that is polarized in a counterclockwise direction.

The circularly polarized light passes through the liquid crystal layer 300, to which the electric field is applied so that a phase of the circularly polarized light is not changed. The light having passed through the liquid crystal layer 300 is reflected from the reflective layer 150 so that a phase of the light is changed by about λ/2. Therefore, the circularly polarized light in the counterclockwise direction becomes a circularly polarized light that is circularly polarized in a clockwise direction.

The reflected light passes through the liquid crystal layer 300 without change. The reflected light passes through the second phase difference film 40 so that a phase of the reflected light is changed by about λ/4. Therefore, the reflected light becomes a linearly polarized light that is linearly polarized in the fourth direction. The linearly polarized light that is polarized in the fourth direction is blocked by the second polarizer 40 so that an image is not displayed.

In addition, a portion c2 of the front light that is provided from an exterior to the display panel assembly passes through the second polarizer 50 to be linearly polarized in the third direction. The linearly polarized light in the third direction passes through the second phase difference film 40 so that a phase of the linearly polarized light in the third direction is changed by about λ/4. Therefore, the linearly polarized light in the third direction becomes a circularly polarized light that is circularly polarized in a counterclockwise direction.

The circularly polarized light passes through the liquid crystal layer 300, to which the electric field is applied, so that a phase of the circularly polarized light is not changed. The light having passed through the liquid crystal layer 300 passes through the transmitting window 152. The light having passed through the transmitting window 152 passes through the first phase difference film 30 so that a phase of the light having passed through the transmitting window 152 is changed by about λ/4. Therefore, the circularly polarized light having passed through the first phase difference film 30 is linearly polarized in the third direction. The linearly polarized light in the third direction is blocked by the first polarizer 20 so that an image is not displayed.

Meanwhile, a portion 'd' of the backlight generated from a backlight assembly (not shown) passes through the transflective layer 10. The light having passed through the transflective layer 10 passes through the first polarizer 20 to be linearly polarized in the fourth direction. The linearly polarized light in the fourth direction passes through the first phase difference film 30 so that a phase of the linearly polarized light in the fourth direction is changed by about λ/4. Therefore, the linearly polarized light in the fourth direction becomes a circularly polarized light that is circularly polarized in the clockwise direction. The circularly polarized light in the clockwise direction passes through the transmitting window 152 and the liquid crystal layer 300, to which the electric field is applied so that a phase of the circularly polarized light is not changed.

The circularly polarized light having passed through the liquid crystal layer 300 passes through the second phase difference film 40 so that a phase of the circularly polarized light is changed by about λ/4. Therefore, the circularly polarized light becomes a linearly polarized light that is linearly polarized in the fourth direction. The linearly polarized light in the fourth direction is blocked by the second polarizer 40 so that an image is not displayed.

According to the display panel assembly shown in FIGS. 1 to 8, the transflective layer 10 that reflects the front light and transmits the backlight is disposed under the first polarizer 20 to partially reflect the portion of the front light, thereby increasing a luminance of the display panel assembly. Thus, the image display quality of the display panel assembly is improved.

Figure 9:
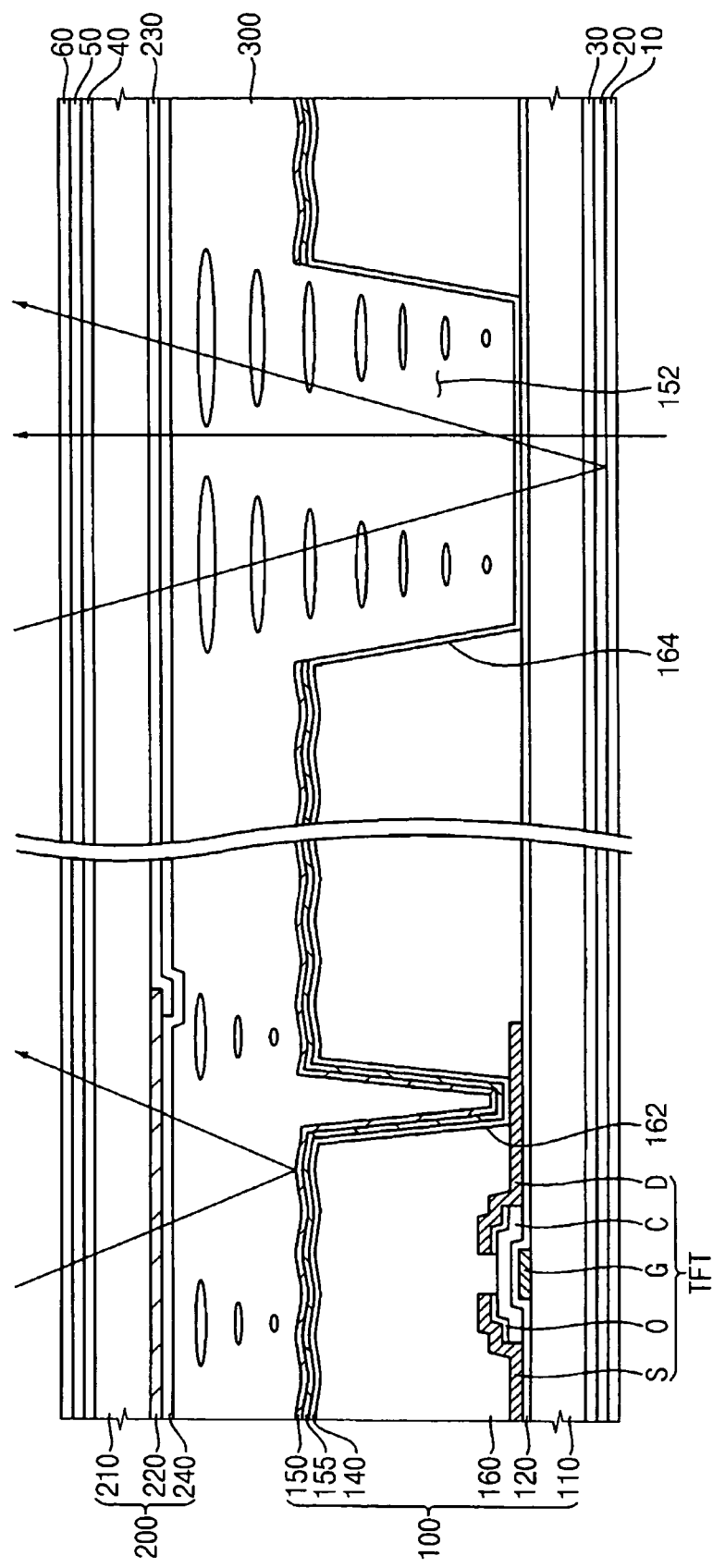
FIG. 9 is a cross-sectional view illustrating a portion of a display panel assembly according to an embodiment of the present invention.

FIG. 9 is a cross-sectional view illustrating a portion of a display panel assembly according to an embodiment of the present invention. The display panel assembly of FIG. 9 the same as in FIGS. 1 to 8 except for a protecting layer and a liquid crystal layer. Thus, the same reference numerals will be used to refer to the same or like parts as those described in FIGS. 1 to 8 and any further explanation concerning the above elements will be omitted.

Referring to FIG. 9, a display panel assembly includes a first substrate 100, a second substrate 200, a liquid crystal layer 300, a transflective layer 10, a first polarizer 20, a first phase difference film 30, a second phase difference film 40, a second polarizer 50 and a light refracting sheet 60 to display an image using a front light that is provided from an exterior to the display panel assembly and a backlight generated from a backlight assembly (not shown) that is disposed under or behind the display panel assembly.

The transflective layer 10, a first polarizer 20 and a first phase difference film 30 are on a lower surface of the first substrate 100, in sequence. In particular, the first phase difference film 30 is on the lower surface of the first substrate. The first polarizer 20 is on a lower surface of the first phase difference film 30. The transflective layer 10 is on a lower surface of the first polarizer 20. The second phase difference film 40, the second polarizer 50 and the light refracting sheet 60 are on an upper surface of the second substrate 200, in sequence. In particular, the second phase difference film 40 is on the upper surface of the second substrate 200. The second polarizer 50 is on an upper surface of the second phase difference film 40. The light refracting sheet 60 is on an upper surface of the second polarizer 50.

The first substrate 100 includes a first transparent substrate 110, a data line DL, a gate line GL, a storage electrode (not shown), a gate insulating layer 120, a thin film transistor TFT, a protecting layer 160, a pixel electrode 140, a reflective layer 150, a connection layer 155 and a first alignment layer (not shown). Alternatively, the first substrate may further include a plurality of data lines, a plurality of gate lines, a plurality of storage electrodes, a plurality of thin film transistors and a plurality of pixel electrodes. The second substrate 200 corresponds to the first substrate 100, and includes a second transparent substrate 210, a light blocking layer 220, a color filter 230, a common electrode 240 and a second alignment layer (not shown). The liquid crystal layer 300 is interposed between the first and second substrates 100 and 200.

The protecting layer 160 is on the gate insulating layer 120 to cover the thin film transistor TFT and the data lines DL. The protecting layer 160 may have an uneven surface.

The protecting layer 160 includes a contact hole 162 through which the drain electrode is partially exposed so that the drain electrode D is electrically connected to the pixel electrode 140. The protecting layer 160 may further include a light transmitting hole 164 for increasing a thickness of the liquid crystal layer 300.

The protecting layer 160 may include an organic layer, and may have a greater thickness than the gate insulating layer 120. For example, a thickness of a second portion of the liquid crystal layer 300 corresponding to the light transmitting hole 164 is about twice a thickness of a first portion of the liquid crystal layer 300 corresponding to the reflective layer 150.

When the front light or the backlight passes through the liquid crystal layer 300 corresponding to the reflective layer 150, a phase of the light is changed by about λ/4. However, when the front light or the backlight passes through the liquid crystal layer 300 corresponding to the transmitting light hole 164, a phase of the light is changed by about λ/2.

Figure 10:
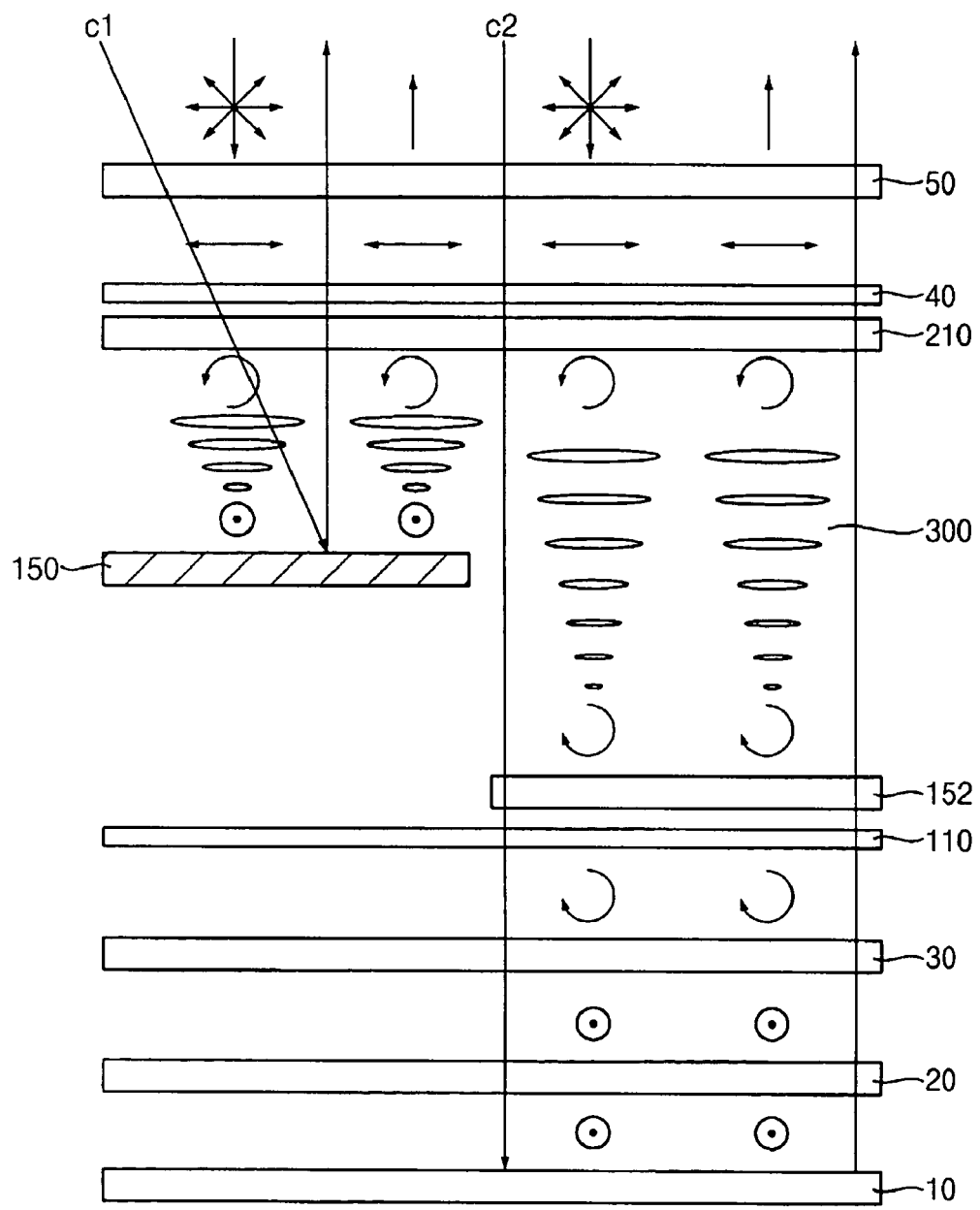
FIG. 10 is a cross-sectional view illustrating a path of light, when an electric field is not applied to a liquid crystal layer of the display panel assembly in FIG. 9.

Hereinafter, a path of light in the display panel assembly is described FIG. 10 is a cross-sectional view illustrating a path of light, when an electric field is not applied to a liquid crystal layer of the display panel assembly in FIG. 9.

Referring to FIGS. 9 and 10, a portion c1 of the front light that is provided from an exterior to the display panel assembly that passes through the second polarizer 50 is linearly polarized in a third direction. The linearly polarized light in the third direction passes through the second phase difference film 40 so that a phase of the linearly polarized light in the third direction is changed by about λ/4. Therefore, the linearly polarized light in the third direction becomes a circularly polarized light that is circularly polarized in a counterclockwise direction.

When the circularly polarized light passes through the liquid crystal layer 300, to which the electric field is not applied, a phase of the circularly polarized light is changed by about λ/4. Therefore, the circularly polarized light is linearly polarized in a fourth direction that is substantially perpendicular to the third direction. The linearly polarized light in the fourth direction is reflected from the reflective layer 150.

The reflected light passes through the liquid crystal layer 300 so that a phase of the reflected light is changed by about λ/4. Thus, the reflected light becomes a circularly polarized light that is circularly polarized in the counterclockwise direction. The circularly polarized light passes through the second phase difference film 40 so that a phase of the circularly polarized light is changed by about λ/4 to be a linearly polarized light in the third direction. The linearly polarized light in the third direction passes through the second polarizer 50 without change, thereby displaying an image.

A portion c2 of the front light that is provided from the exterior to the display panel assembly to be incident into the transmitting window 152 passes through the second polarizer 50 to be linearly polarized in the third direction. The linearly polarized light in the third direction passes through the second phase difference film 40 so that a phase of the linearly polarized light in the third direction is changed by about λ/4. Therefore, the linearly polarized light in the third direction becomes circularly polarized light that is circularly polarized in a counterclockwise direction.

When the circularly polarized light passes through the liquid crystal layer 300, to which the electric field is not applied, a phase of the circularly polarized light is changed by about a λ/2 phase. Therefore, the circularly polarized light becomes a circularly polarized light that is circularly polarized in the clockwise direction. The thickness of the liquid crystal layer 300 corresponding to the transmitting light hole 162 is substantially twice the thickness of the liquid crystal layer 300 corresponding to the reflective layer 150.

The circularly polarized light passes through the first phase difference film 30 that is disposed under the first transparent substrate 110 so that a phase of the circularly polarized light is changed by about λ/4. Therefore, the circularly polarized light becomes a linearly polarized light that is polarized in the fourth direction. The circularly polarized light in the fourth direction passes through the first polarizer 20 without change. The light having passed through the first polarizer 20 is reflected from the transflective layer 10 toward the front of the transflective layer 10. The reflected light passes through the first polarizer 20 without change. The light having passed through the first polarizer 20 passes through the first phase difference film 30 so that a phase of the light is changed by about λ/4. Therefore, the light that is polarized in the fourth direction becomes a circularly polarized light that is circularly polarized in the clockwise direction.

The circularly polarized light passes through the liquid crystal layer 300 so that a phase of the circularly polarized light is changed by about λ/2. Therefore, the circularly polarized light in the clockwise direction becomes a circularly polarized light that is circularly polarized in the counterclockwise direction. The circularly polarized light passes through the second phase difference film 40 so that a phase of the circularly polarized light is changed by about λ/4. Therefore, the circularly polarized light becomes a linearly polarized light that is linearly polarized in the third direction. The linearly polarized light in the third direction passes through the second polarizer 50 without change, thereby displaying an image.

A portion of the backlight generated from the backlight assembly (not shown) passes through the transflective layer 10. The light having passed through the transflective layer 10 passes through the first polarizer 20 to be linearly polarized in the fourth direction. The linearly polarized light having passed through the first polarizer 20 passes through the first phase difference film 30 so that a phase of the linearly polarized light is changed by about λ/4. Therefore, the linearly polarized light becomes a circularly polarized light that is circularly polarized in the clockwise direction.

The circularly polarized light passes through the liquid crystal layer 300 so that a phase of the circularly polarized light is changed by about λ/2. Therefore, the circularly polarized light in the clockwise direction becomes a circularly polarized light in the counterclockwise direction. The circularly polarized light passes through the second phase difference film 40 so that a phase of the circularly polarized light is changed by about λ/4. Therefore, the circularly polarized light is linearly polarized in the third direction. The linearly polarized light in the third direction passes through the second polarizer 50 without change, and exits the second polarizer 50 through an upper surface of the second polarizer 50, thereby displaying an image.

Figure 11:
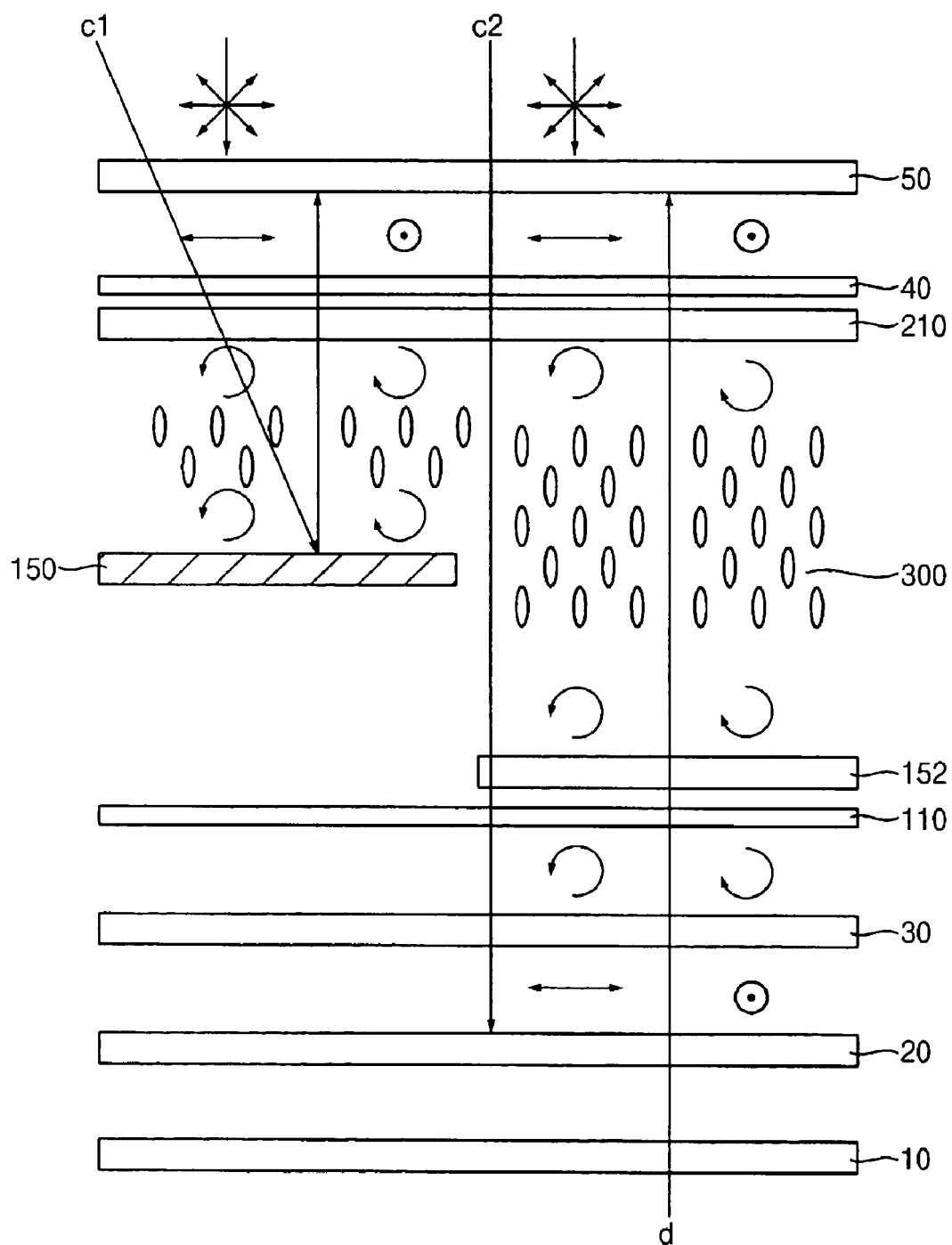
FIG. 11 is a cross-sectional view illustrating a path of light, when an electric field is applied to a liquid crystal layer of the display panel assembly in FIG. 9.

FIG. 11 is a cross-sectional view illustrating a path of light, when an electric field is applied to a liquid crystal layer of the display panel assembly in FIG. 9.

Referring to FIGS. 9 and 11, a portion c1 of the front light that is provided from an exterior to the display panel assembly passes through the second polarizer 50 to be linearly polarized in a third direction. The linearly polarized light in the third direction passes through the second phase difference film 40 so that a phase of the linearly polarized light in the third direction is changed by about λ/4. Therefore, the linearly polarized light in the third direction becomes a circularly polarized light that is circularly polarized in a counterclockwise direction.

The circularly polarized light passes through the liquid crystal layer 300, to which the electric field is applied, so that a phase of the circularly polarized light is not changed. The circularly polarized light is reflected from the reflective layer 150 so that a phase of the reflected light is changed by about λ/2. Therefore, the reflected light becomes a circularly polarized light that is circularly polarized in the clockwise direction.

The reflected light passes through the liquid crystal layer 300 without change. The light having passed through the liquid crystal layer 300 passes through the second phase difference film 40 so that the phase of the reflected light is changed by about λ/4. Therefore, the reflected light having passed through the second phase difference film 40 becomes a linearly polarized light that is linearly polarized in the fourth direction. The linearly polarized light in the fourth direction is blocked by the second polarizer 40 so that an image is not displayed.

Also, a portion c2 of the front light that is provided from the exterior to the display panel assembly passes through the second polarizer 50 to be linearly polarized in the third direction. The linearly polarized light in the third direction passes through the second phase difference film 40 so that a phase of the linearly polarized light in the third direction is changed by about λ/4. Therefore, the linearly polarized light in the third direction becomes a circularly polarized light that is circularly polarized in a counterclockwise direction.

The circularly polarized light passes through the liquid crystal layer 300, to which the electric field is applied, so that the phase of the circularly polarized light is not changed. The circularly polarized light having passed through the liquid crystal layer 300 passes through the transmitting window 152 without change. The light having passed through the transmitting window 152 passes through the first phase difference film 30 so that a phase of the light having passed through the transmitting window 152 is changed by about λ/4. Therefore, the circularly polarized light having passed through the transmitting window 152 becomes a linearly polarized light that is linearly polarized in the third direction. The linearly polarized light in the third direction is blocked by the first polarizer 20 so that an image is not displayed.

A portion 'd' of the backlight generated from the backlight assembly (not shown) passes through the transflective layer 10. The light having passed through the transflective layer 10 passes through the first polarizer 20, and is linearly polarized in the fourth direction. The linearly polarized light in the fourth direction passes through the first phase difference film 30 so that a phase of the linearly polarized light in the fourth direction is changed by about λ/4. Therefore, the linearly polarized light in the fourth direction becomes a circularly polarized light that is circularly polarized in a clockwise direction. The circularly polarized light in the clockwise direction passes through the transmitting window 152 and the liquid crystal layer 300, to which the electric field is applied, without change.

The circularly polarized light having passed through the liquid crystal layer 300 passes through the second phase difference film 40 so that a phase of the circularly polarized light is changed by about λ/4. Therefore, the circularly polarized light is linearly polarized in the fourth direction. The linearly polarized light in the fourth direction is blocked by the second polarizer 40 so that an image is not displayed.

Figure 12:
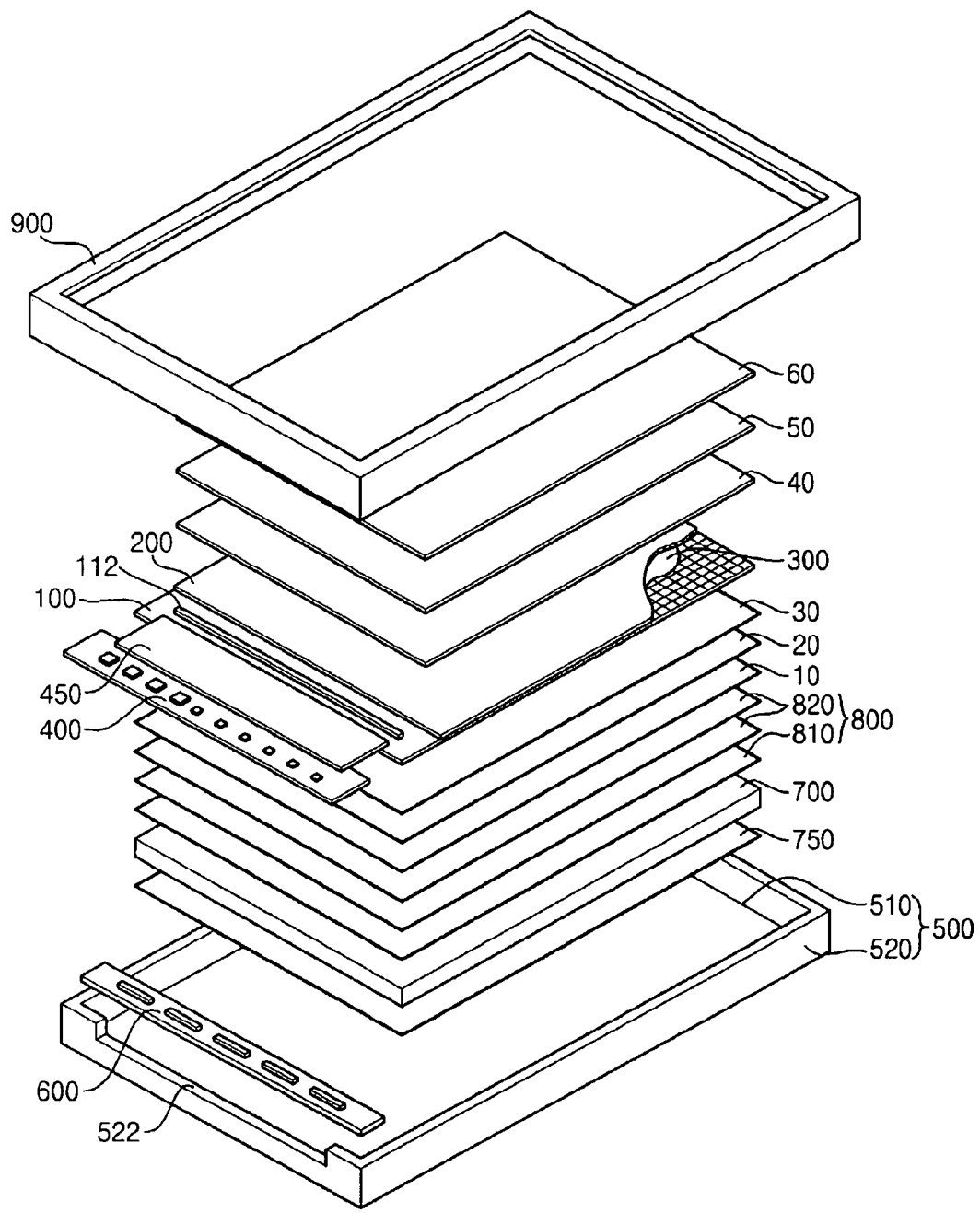
FIG. 12 is a perspective view illustrating a display apparatus according to an embodiment of the present invention.

FIG. 12 is a perspective view illustrating a display apparatus according to an embodiment of the present invention. The display panel assembly of FIG. 12 is the same as in FIGS. 1 to 8. Thus, the same reference numerals will be used to refer to the same or like parts as those described in FIGS. 1 to 8 and any further explanation concerning the above elements will be omitted.

Referring to FIG. 12, the display apparatus includes the display panel assembly, a printed circuit board 400, a flexible circuit board 450, a backlight assembly and a top chassis 900.

The display panel assembly displays an image using a front light and a backlight. The front light is provided from an exterior to the display panel assembly. The backlight is generated from the backlight assembly. The display panel assembly includes a first substrate 100 having the thin film transistors, a second substrate 200 having a color filter 230, shown in FIG. 3, and a liquid crystal layer 300 interposed between the first and second substrates 100 and 200. A driving chip 112 is on a peripheral portion of the first substrate 100.

The display panel assembly may further include a transflective layer 10, a first polarizer 20, a first phase difference film 30, a second phase difference layer 40, a second polarizer 50 and a light refracting sheet 60. The transflective layer 10, the first polarizer 20 and the first phase difference film 30 are under the first substrate 100. In particular, the first phase difference film 30 is on a lower surface of the first substrate 100. The first polarizer 20 is on a lower surface of the first phase difference film 30. The transflective layer 10 is on a lower surface of the first polarizer 20. The second phase difference film 40, the second polarizer 50 and the light refracting sheet 60 are on the second substrate 200. In particular, the second phase difference film 40 is on an upper surface of the second substrate 200. The second polarizer 50 is on an upper surface of the second phase difference film 40. The light refracting sheet 50 is on an upper surface of the second polarizer 50.

The printed circuit board 400 includes a driving circuit unit for processing image signals. The driving circuit unit changes the image signals that are provided from an exterior to the display panel assembly into first driving signals for controlling the driving chip 112.

The flexible circuit board 450 is electrically connected between the printed circuit board 400 and the first substrate 100, and applies the first driving signals that are generated from the printed circuit board 400 to the driving chip 112 of the first substrate 100. The driving chip 112 generates second driving signals for controlling the thin film transistors based on the first driving signals. The flexible circuit board 450 is backwardly bent so that the printed circuit board 400 is on a lower portion of the display apparatus.

The backlight assembly includes a receiving container 500, a light-generating unit 600, a light guiding plate 700, a reflective plate 750 and optical sheets 800.

The receiving container 500 includes a bottom plate 510 and side walls 520 protruded from sides of the bottom plate 510. The bottom plate 510 and the side walls 520 of the receiving container 500 define a receiving space to receive the light-generating unit 600, the light guiding plate 700, the reflective plate 750, optical sheets 800 and the display panel assembly. A groove 522 is formed at one of the side walls 520. The flexible circuit board 450 may be easily bent to fit along the groove 522.

The light-generating unit 600 is adjacent to one of the sidewalls 520 of the receiving container 500. The light-generating unit 600 may face the sidewall 520. An external power supplying source (not shown) applies an electric power to the light-generating unit 600 to generate light. Alternatively, two light-generating units 600 may be on opposite sidewalls 520 to face each other.

The light-generating unit 600 may be a light-emitting diode generating a point shaped light. A plurality of light-emitting diodes is disposed on a driving substrate to receive the electric power through the driving substrate. The light-generating unit generates the light to supply a side surface of the light guiding plate 700 with the light. Alternatively, the light-generating unit 600 may be a cold cathode fluorescent lamp (CCFL).

The light guiding plate 700 is in the receiving space of the receiving container 500 so that the side surface of the light guiding plate 700 faces the light-generating unit 600. The light generated from the light-generating unit 600 is incident into the side surface of the light guiding plate 700, and is refracted and reflected to exit the light guiding plate 700 through an upper, flat surface of the light guiding plate 700. The light exiting the light guiding plate 700 is the backlight that is incident into the display panel assembly.

The reflective plate 750 is in the receiving container 500 on the light guiding plate 700. A portion of the light leaked from the light guiding plate 700 through a lower surface of the light guiding plate 700 is reflected from the reflective plate 750 towards the light guiding plate 700.

The optical sheets 800 are on the backlight assembly to improve optical characteristics of the backlight. The optical sheets 800 may include a diffusion sheet 810 and at least one prism sheet 820, having a number of individual prisms. The diffusion sheet 810 diffuses the backlight to increase luminance uniformity of the backlight. The prism sheet 820 increases a luminance when viewed off axis.

The top chassis 900 covers peripheral portions of the display panel assembly, and is combined with the sidewalls 520 of the receiving container 500. The top chassis 900 protects the fragile display panel assembly from an externally provided impact and an externally provided vibration to prevent damage to the display panel assembly. The top chassis 900 may also fix the display panel assembly to the receiving container 500.

According to the display panel and the display apparatus having the display panel, the transflective layer is disposed under the first substrate to transmit the backlight and to reflect a portion of the front light that is provided from an exterior to the display panel apparatus. Therefore, the luminance of the display apparatus is increased, and the image display quality is improved.

In addition, the luminance of the display apparatus is increased by the reflection of the front light, as the power consumption for generating the backlight is decreased.

Although the exemplary embodiments of the present invention have been described, it is understood that the present invention should not be limited to these exemplary embodiments and various changes and modifications can be made by one of ordinary skill in the art within the spirit and scope of the present invention as hereinafter claimed.

What is claimed is:

1. A display panel assembly comprising:
a display panel including two substrates and a liquid crystal layer interposed between the two substrates; and
a transflective member arranged under the display panel to transmit a backlight toward the display panel and to reflect a front light having passed through a front of the display panel back toward the display panel,
wherein the transflective member comprises:
a base sheet arranged under the display panel. the base sheet having a first refractive index; and
a total reflective material in grooves formed in the base sheet, the total reflective material having a second refractive index larger than the first refractive index, so that the front light is totally reflected from the total reflective material.

2. The display panel assembly of claim 1, further comprising a reflective material interposed between the total reflective material and the base sheet to increase a reflectivity of the total reflective material.

3. The display panel assembly of claim 2, wherein the total reflective material comprises a metal.

4. The display panel assembly of claim 1, wherein each of the grooves has a substantially triangular cross-section.

5. The display panel assembly of claim 4, wherein the triangle is a substantially equilateral triangle, and a lower side of the equilateral triangle is substantially parallel with the display panel.

6. The display panel assembly of claim 1, wherein each of the grooves has a substantially polygonal pyramid shape, and a lower surface of the polygonal pyramid is substantially parallel with the display panel.

7. The display panel assembly of claim 1, wherein each of the grooves has a substantially conical shape, and a lower surface of the cone is substantially parallel with the display panel.

8. The display panel assembly of claim 1, wherein the base sheet comprises polymethyl methacrylate (PMMA).

9. The display panel assembly of claim 1, wherein a refractive index of the total reflective material is larger than a refractive index of the base sheet.

10. The display panel assembly of claim 1, further comprising:
a first polarizer arranged under the display panel to polarize the light in a first direction; and
a second polarizer arranged on the display panel to polarize the light in a second direction that is substantially perpendicular to the first direction.

11. The display panel assembly of claim 1, further comprising:
a first phase difference film arranged under the display panel, the first phase film extending in a first longitudinal direction to change a phase of the light; and
a second phase difference film on the display panel, the second phase difference film extending in a second longitudinal direction that is substantially perpendicular to the first longitudinal direction to change a phase of the light.

12. The display panel assembly of claim 11, wherein each of the first and second phase difference films changes a phase of the light by about $\lambda/4$.

13. The display panel assembly of claim 1, further comprising a light refracting sheet for increasing a luminance of the light exiting the display panel when viewed on axis.

14. The display panel assembly of claim 13, wherein the light refracting sheet comprises a plurality of prisms for refracting the light exiting the light refracting sheet.

15. The display panel assembly of claim 14, wherein the plurality of prisms have a substantially sawtooth shape.

16. The display panel assembly of claim 1, wherein the two substrates of the display panel comprise:
a first substrate including a reflective portion for reflecting a portion of the front light and a transmitting window for transmitting a portion of the backlight; and
a second substrate corresponding to the first substrate wherein the liquid crystal layer is interposed between the first and second substrates.

17. The display panel assembly of claim 16, wherein a first portion of the liquid crystal layer corresponding to the reflective portion has a first thickness, and a second portion of the liquid crystal layer corresponding to the transmitting window has a second thickness different than the first thickness.

18. The display panel assembly of claim 17, wherein the second thickness is twice the first thickness.

19. A display apparatus comprising:
a backlight assembly generating a backlight; and
a display panel assembly including:
a display panel displaying an image using a front light and the backlight; and
a transflective member transmitting the backlight toward a front of the display panel and reflecting the front light having passed through the display panel back toward the front of the display panels,
wherein the transflective member comprises:
a base sheet arranged under the display panel, the base sheet having a first refractive index; and a total reflective material in grooves formed in the base sheet, the total reflective material having a second refractive index larger than the first refractive index, so that the front light is totally reflected from the total reflective material.

20. The display panel assembly of claim 19, wherein the backlight assembly comprises a light-emitting diode generating a point light.

* * * * *